United States Patent [19]

Busey

[11] 3,911,684
[45] Oct. 14, 1975

[54] METHOD FOR UTILIZING DECAY HEAT FROM RADIOACTIVE NUCLEAR WASTES

[75] Inventor: Harold M. Busey, Bethesda, Md.

[73] Assignee: The United States of America as represented by the United States Energy Research and Development Administration, Washington, D.C.

[22] Filed: Aug. 29, 1974

[21] Appl. No.: 501,726

[52] U.S. Cl. ...................... 60/644; 122/32; 165/45; 250/507; 252/301.1 WD
[51] Int. Cl.² ........................................... F03G 7/00
[58] Field of Search ........... 60/644; 122/32; 165/45; 176/87; 252/301.1 WD; 250/432, 496, 506, 507, 515

[56] References Cited
UNITED STATES PATENTS 3,046,403    7/1962    Montgomery...................... 250/507

OTHER PUBLICATIONS

"We Can Harness The Atom," Popular Science, December 1945, pp. 68 and 122.

Primary Examiner—Allen M. Ostrager
Attorney, Agent, or Firm—Dean E. Carlson; Arthur A. Churm; Frank H. Jackson

[57] ABSTRACT

Management of radioactive heat-producing waste material while safely utilizing the heat thereof is accomplished by encapsulating the wastes after a cooling period, transporting the capsules to a facility including a plurality of vertically disposed storage tubes, lowering the capsules as they arrive at the facility into the storage tubes, cooling the storage tubes by circulating a gas thereover, employing the so heated gas to obtain an economically beneficial result, and continually adding waste capsules to the facility as they arrive thereat over a substantial period of time.

3 Claims, 3 Drawing Figures

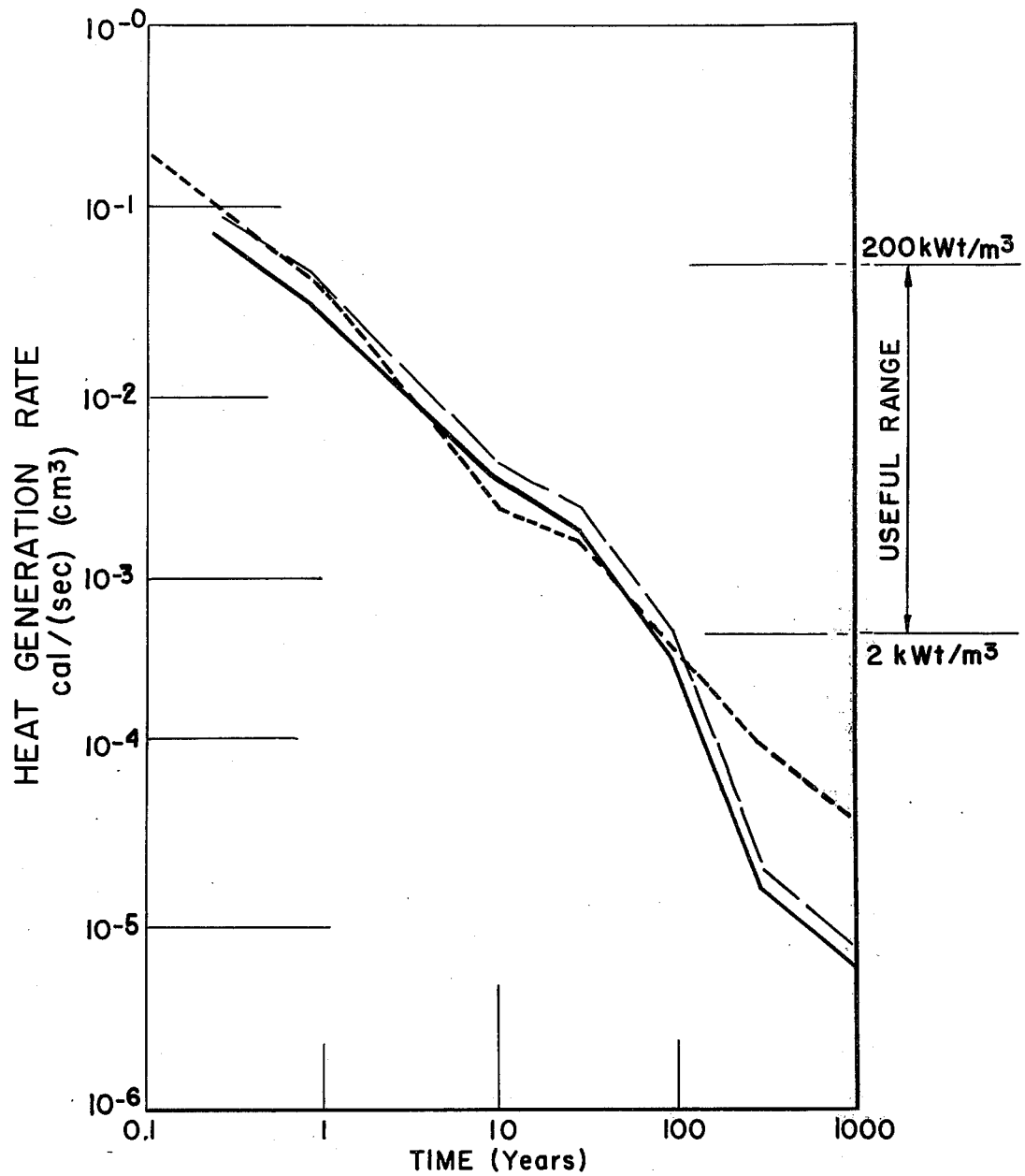

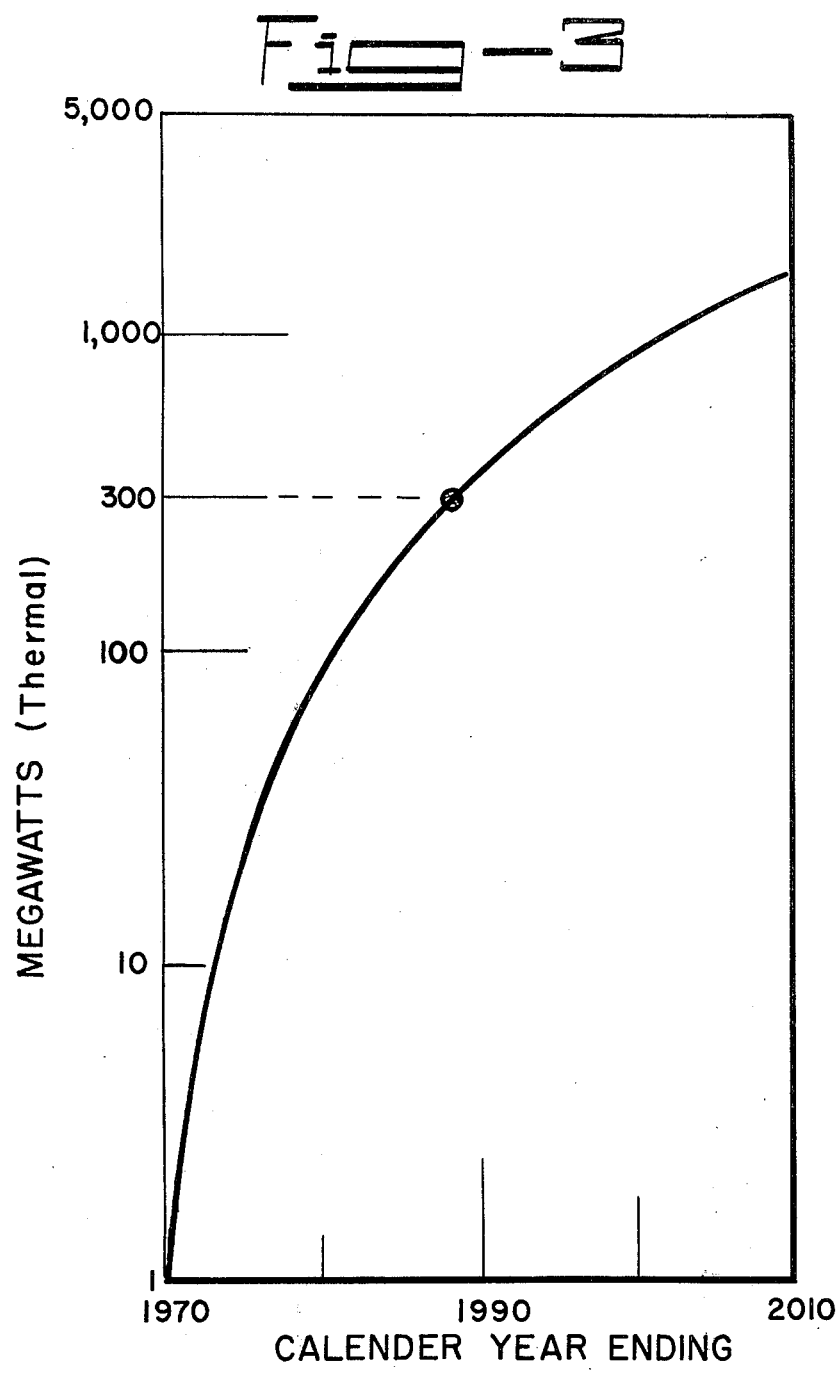
DECAY HEAT EXPECTED TO BE AVAILABLE FROM RADIOISOTOPES IN FUTURE YEARS.

METHOD FOR UTILIZING DECAY HEAT FROM RADIOACTIVE NUCLEAR WASTES

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a method for utilizing decay heat from radioactive nuclear wastes. In more detail, the invention relates to a method of possible permanent disposal of radioactive nuclear waste wherein the heat generated therein is utilized in an economically beneficial manner.

Fission products and other nuclear waste materials are produced in large quantities during normal production of nuclear power, and the Federal Government and industry are burdened with responsibility for the safe storage and ultimate disposal of this material. Disposal and storage of this material is very expensive; therefore, many studies have been made to find uses for these materials and thereby reduce waste management and disposal costs.

Potential uses fall into three classes: a source of radiation, a source of heat, and a source of valuable elements such as palladium. The demand for fission products as irradiation sources in no way approaches the quantity available at this time. Also large markets for decay heat and individual rare elements have not been developed.

Spent fuel elements as removed from a nuclear reactor contain uranium and plutonium (and possibly thorium) which are of sufficient value to make their recovery for reuse worthwhile. Normally, spent fuel elements are dissolved and valuable constituents are separated from the chemical solution by solvent extraction. Fission products and other materials remaining in the aqueous solution constitute the high level radioactive waste solution which must be managed for a long period of time. Ultimately this material must be solidified and placed in a permanent disposal site.

The compositions of radioactive wastes vary, depending on the original fuel and cladding compositions, the degree of burnup, the fuel reprocessing and waste processing procedures used, and the cooling time. A cooling time of about 6 months would be expected to elapse between removal of spent fuel from a reactor core and the completion of fuel reprocessing. The highly radioactive waste contains fission products, actinide elements, cladding, and other materials. When this mixture has been converted to one of several possible solid forms, it is a suitable heat source for the invention.

Another source suitable for heat is a mixture of long-half-life, heat producing elements that has been separated from the bulk of the waste for separate storage. The purpose of such separation is to lessen the heat disposal problem in storing the bulk of the waste. At present, $^{90}Sr$ and $^{137}Cs$ are separated from other radioactive materials for this purpose. In one procedure, strontium and cesium sales are encapsulated in double-wall stainless steel capsules 60 cm long (2 feet) and 10 cm in diameter (4 inches). Then this highly radioactive waste is stored under water for long periods for shielding and cooling purposes. Other heat producers are some of the actinide elements of higher atomic number that build up when plutonium is recycled as a nuclear fuel. If the elements having heat-producing isotopes with half-lives longer than about 2 years are separated from other wastes, a concentrated, useful heat source can be obtained.

SUMMARY OF THE INVENTION

According to the present invention, radioactive waste materials are stored to allow short half-life radioisotopes to decay, solidified, encapsulated, and transported to a waste facility wherein they are lowered into vertical storage tubes disposed in a heating chamber that may be below ground level. The storage tubes are cooled by flowing a gas at suitable temperature, pressure, and velocity thereover, and the heat of the gas is used for the production of useful power or other economically beneficial purposes. Capsules are inserted into the storage tubes as soon as received at the waste facility. The storage tubes may be cooled with air by natural convection or by other gases such as helium, argon, or nitrogen, when demand from the power plant or other purpose is down. The choice of the specific gas may be made on the basis of its chemical compatibility with various components in the system. When the heat generation rate of the radioactive material has dropped to below a useful level, the capsules can be removed, or they can be left in place and cooled by natural convection until it is safe to fill the heating chamber with concrete for permanent disposal.

BRIEF DESCRIPTION OF THE DRAWING

FIG. 2 is a graph giving decay curves for wastes from nuclear fuels of several types and burnups. This graph is based on information from ORNL-4762, February 1972.

FIG. 3 is a graph showing the decay heat expected to be available from radioisotopes in future years.

SPECIFIC EMBODIMENT OF THE INVENTION

Figure 1:
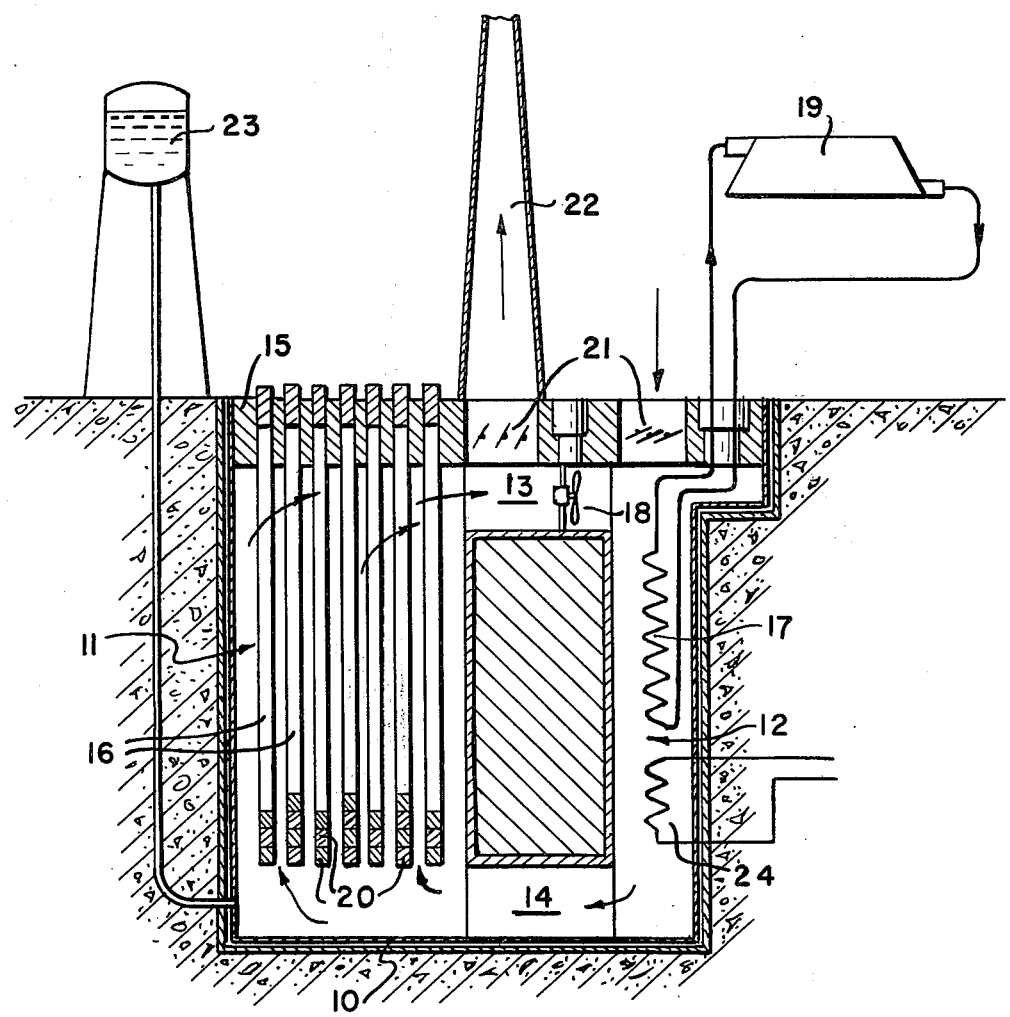
FIG. 1 of the drawing is a sketch of a system for utilizing the decay heat of fission products or other radioactive wastes wherein the method of the present invention may be practiced.

As shown in the drawing, an underground facility in which the method of the present invention can be practiced includes a deep pit pressure container 10 including a heating chamber 11 and a cooling chamber 12 placed into communication by heated-gas channel 13 and cooled-gas channel 14. Pit 10 is provided with a cover 15 through which a plurality of vertically disposed storage tubes 16 extend into heating chamber 11 while cooling chamber 12 contains heat exchangers 17 and 24. Heat exchanger 24 is a part of a redundant cooling loop capable of being used if the cooling loop containing heat exchanger 17 requires shutdown. Air or another gas is circulated at the proper pressure between heating chamber 11 and cooling chambers 12 by fan means 18, thereby cooling storage tubes 16. The recirculating gas is cooled by a heat transfer fluid present in heat exchangers 17 and 24 and the heat transfer fluid may be used in any economically beneficial manner such as to develop power in turbine 19 or for other agricultural or industrial purposes. The heated gas may also be used directly in a gas turbine to develop power.

In carrying out the method of the present invention, radioactive wastes are solidified and encapsulated. The encapsulated solidified wastes 20 are transferred to the underground waste facility shown in the drawing and lowered into one of the storage tubes 16. Storage tubes 16 have a large excess of capacity so that the first capsules 20 added fill only a fraction of their volume. Capsules 20 are inserted into the storage tubes 16 as they arrive at the facility over a long period of time. Thus as the heat produced by the capsules 20 which have been in the facility for the longest time decreases, fresh heat-producing capsules 20 are continually added, making the heat output relatively constant.

During periods when turbine 19 is shut down and the redundant safety cooling loops 24 are not operating, louvers 21 are opened, admitting air to the facility from the atmosphere. The air circulates over the storage tubes 16 by natural convection and is returned to the atmosphere through stack 22. Also, emergency cooling may be obtained by flooding the facility with water from storage tank 23.

At the end of the period of useful plant life, the remaining heat-producing radioactive waste materials present in capsules 20 are cooled by natural convection by opening louvers 21. This cooling must be continued for an extended period of time. Later, either the capsules or the storage tubes are removed and the fission products present therein are chemically separated or, alternatively, heating chamber 11 is filled with concrete for permanent disposal of the radioactive waste material.

Estimates of the heat available (shown in FIG. 3) and the cumulative volume of high-level nuclear waste from the power program between 1970 and 2010 have been made, based on predictions of nuclear power plant construction. Using the approximation that an average of about 1 MWt is available as decay heat for each 1000 MWe of installed nuclear power plant capacity, it is estimated that by 1990 over 300 MWt will be available in the United States. At a 33% conversion efficiency, this could produce 100 MWe.

Decay of the rate of heat production of mixed fission products has been studied. Decay curves for waste from nuclear fuels of several types and burnups are shown in FIG. 2. In the use of this graph, it should be remembered that about 6 months elapse between fuel removal from a reactor and the availability of the encapsulated fission products as a source of useful heat. As to the volume of wastes required to generate a given quantity of heat, it is estimated that a cubic meter of partially aged waste will yield 10 kWt. Thus, for a 100 MWe decay heat power plant, 30,000 cubic meters of solidified waste would be needed. If the volume of coolant is approximately equal to the waste volume, a total enclosed and shielded heater space of 60,000 cubic meters would be necessary. Thus, the heat source for a 100-MWe power plant would have the volume of a cube 39 meters on an edge. This is very large, but construction is possible. If the heat-producing fission products are separated from other wastes, this large volume can be reduced significantly.

A preliminary estimate has been made of the value of fission product decay heat if used to generate electricity. In the following estimate, it is assumed that an encapsulated heatproducing mixture is loaned at no charge to a small power plant to make use of the waste heat. It is also assumed that the electrical power at the bus bar is sold for 1 cent/kWh, that the plant cost is $700/kWe, and that the plant operates at base load for 70 years for 100% of the time. Of course, the assumed load factor is higher than would be experienced, but the plant will be in operation most of the time because heat will be generated all of the time.

For the decay heat power plant, there is neither an expenditure for the heat source by the user, since the fission products are packaged for storage normally, nor is there an expenditure for waste management by the U.S. Government or industry while the radioactive material is used as a heat source.

In the table below, a preliminary estimate of the cost of this decay heat power plant and the estimated return are given.

| Decay Heat Power Plant Cost and Value of Power Produced | |
|---|---|
| Electrical power capacity | 100,000 kWe |
| Thermal capacity | 300,000 kWt |
| Plant cost at $700/kWe | $70 million |
| Cost of heat | 0 |
| Estimate of value of electrical power at bus bar | 1 cent/kWh |
| Electrical power produced | $8.6 \times 10^8$ kWh/yr |
| Value of power | $8.6 \times 10^6$/yr |
| Power value for 70-year plant life | $600 million |

| Cost per year of operation | |
|---|---|
| Interest and amortization at 10%/year | $7 million |
| Salaries (20-man staff) | 0.4 million |
| Other operating costs | 0.2 million |
| Profit or contingency | 1.0 million |
| Total | $8.6 million/yr |

The embodiments of the invention in which an exclusive property or privilege is claimed are defined as follows:

1. A method of disposing of high-level radioactive fission products or waste materials and simultaneously utilizing the heat therefrom, comprising solidifying the wastes, encapsulating the solidified wastes, transferring the encapsulated solidified wastes to a facility having a large excess of capacity and lowering them into one of a plurality of vertically disposed storage tubes present therein, cooling the storage tubes by circulating a gas thereover and utilizing the heat of the heated gas, and continually adding waste capsules to the facility as they arrive at the facility over a substantial period of time.

2. Method according to claim 1 wherein atmospheric air cools the storage tubes by convection when the facility is shut down.

3. Method according to claim 2 wherein the storage tubes are cooled with air by convection at the end of the period of useful facility life for an extended time, following which the heating chamber is filled with concrete for permanant disposal.

* * * * *